United States Patent
Beer et al.

(10) Patent No.: US 8,360,929 B2
(45) Date of Patent: Jan. 29, 2013

(54) METHOD AND CONTROL DEVICE FOR OPERATING A HYBRID DRIVE

(75) Inventors: Johannes Beer, Regensburg (DE); Roland Herfurth, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 339 days.

(21) Appl. No.: 12/921,192

(22) PCT Filed: Feb. 19, 2009

(86) PCT No.: PCT/EP2009/051945
§ 371 (c)(1),
(2), (4) Date: Sep. 7, 2010

(87) PCT Pub. No.: WO2009/115387
PCT Pub. Date: Sep. 24, 2009

(65) Prior Publication Data
US 2011/0015032 A1    Jan. 20, 2011

(30) Foreign Application Priority Data
Mar. 18, 2008 (DE) .......... 10 2008 014 683

(51) Int. Cl.
B60W 1/00    (2006.01)
B60W 1/02    (2006.01)
B60W 10/20   (2006.01)

(52) U.S. Cl. .............. 477/5; 477/3; 180/65.28

(58) Field of Classification Search .......... 477/3, 5
See application file for complete search history.

(56) References Cited

U.S. PATENT DOCUMENTS

| | | | |
|---|---|---|---|
| 6,175,785 B1 | 1/2001 | Fujisawa et al. | 701/22 |
| 6,176,808 B1* | 1/2001 | Brown et al. | 477/5 |
| 6,190,282 B1 | 2/2001 | Deguchi et al. | 477/5 |
| 6,722,332 B2 | 4/2004 | Kojima | 123/179.3 |
| 6,907,950 B2 | 6/2005 | Notsu et al. | 180/65.7 |

(Continued)

FOREIGN PATENT DOCUMENTS

| | | |
|---|---|---|
| DE | 101 50 314 A1 | 5/2002 |
| DE | 102 42 684 A1 | 3/2004 |

(Continued)

OTHER PUBLICATIONS

International PCT Search Report and Written Opinion, PCT/EP2009/051945, 19 pages.

(Continued)

Primary Examiner — David D Le
Assistant Examiner — Colby M Hansen
(74) Attorney, Agent, or Firm — King & Spalding L.L.P.

(57) ABSTRACT

In a control unit and a method for operating a hybrid drive arrangement (1) with an internal combustion engine (5), an electric drive (3) and a coupling device (20) that is arranged therebetween, when the internal combustion engine (5) and the electric drive (3) should be coupled together, the rotational speed of the internal combustion engine (5) is pilot-controlled to a target rotational speed level (N2) such that the drive shafts (4, 6) of the internal combustion engine (5) and the electric drive (3) run at least approximately synchronously. The pilot-control takes place by the throttle valve. Subsequently, the rotational speed of the internal combustion engine (5) is controlled in such a manner that the drive shafts (4, 6) of the internal combustion engine (5) and the electric drive (3) run essentially synchronously. Then, the drive shafts (4, 6) are joined by the coupling device (20).

19 Claims, 3 Drawing Sheets

U.S. PATENT DOCUMENTS

| | | | |
|---|---|---|---|
| 7,526,373 B2 | 4/2009 | Erhart et al. | 701/51 |
| 7,810,593 B2 * | 10/2010 | Kiuchi | 180/65.285 |
| 2006/0289212 A1 * | 12/2006 | Haruhisa | 180/65.2 |
| 2007/0284937 A1 | 12/2007 | Deiml et al. | 303/115.3 |
| 2009/0043437 A1 * | 2/2009 | Shiino | 701/22 |
| 2009/0143189 A1 * | 6/2009 | Hasegawa et al. | 477/5 |

FOREIGN PATENT DOCUMENTS

| | | |
|---|---|---|
| DE | 10 2006 027 387 A1 | 12/2007 |
| EP | 0965475 A2 | 12/1999 |
| EP | 1201479 A2 | 5/2002 |
| EP | 1 354 746 A1 | 10/2003 |
| EP | 1 439 087 A2 | 7/2004 |

OTHER PUBLICATIONS

Zeitz, M., "Vorsteuerung—Nichts ist so praktisch wie eine gute Theorie", Internet Citation, www.plt.rwth-aachen.de/fileadmin/plt/aktuelles/sommerkolloquiu , 23 pages, XP002528264.

* cited by examiner

METHOD AND CONTROL DEVICE FOR OPERATING A HYBRID DRIVE

CROSS-REFERENCE TO RELATED APPLICATIONS

This application is a U.S. National Stage Application of International Application No. PCT/EP2009/051945 filed Feb. 19, 2009, which designates the United States of America, and claims priority to German Application No. 10 2008 014 683.8 filed Mar. 18, 2008, the contents of which are hereby incorporated by reference in their entirety.

TECHNICAL FIELD

The present invention relates to a method and control unit for operating a hybrid drive.

BACKGROUND

Motor vehicles with a hybrid drive (hereinafter referred to as hybrid vehicles for short) that comprise both an internal combustion engine and an electric drive are known from the prior art.

In this case it is possible for only the electric drive to be connected to the wheels of the motor vehicle, the internal combustion engine being used, by way of a generator, to power the electric drive or an electric battery, which constitutes an energy source for the electric drive.

In other hybrid drive designs both the internal combustion engine and two electric drives transfer their drive energy to the vehicle wheels via a common gear arrangement, the arrangement also comprising a generator that is used to generate electric energy during operation of the internal combustion engine.

In another hybrid drive design, as is shown schematically in FIG. 1 with reference to a hybrid drive arrangement 1, an internal combustion engine 5 having a drive shaft 6 and an electric drive 3 having a drive shaft 4 act on a common crankshaft 10 in such a way that the torques of the internal combustion engine 5 and of the electric drive 3 are added together. A conventional gear unit 15 adapts the torques of the internal combustion engine 5 and of the electric drive 3 to the respective driving conditions.

A coupling 20 is arranged between the internal combustion engine 5 and the electric drive 3 in such a way that the electric drive 3 can be operated independently of the internal combustion engine 5 so as to drive one or more driving wheels 25 via a gear unit 15, drive train 30 and differential gearing 35.

The internal combustion engine 5 is conventionally started by a starter motor or belt starter generator 40, the belt starter generator 40 being connected to the crankshaft 10 via a belt pulley 42 and a belt 44.

At least a control unit 50 controls the internal combustion engine 5, the belt starter generator 40, the electric drive 3 and the gear unit 15 via corresponding control commands.

An electric energy source 55 supplies the belt starter generator 40 and the electric drive 3, which can also be operated as a generator, with electric energy, the electric energy source 55 also being able to store electric energy supplied from the electric drive 3 if the electric drive 3 is operated as a generator driven by the internal combustion engine 5.

The hybrid drive design shown in FIG. 1 only allows the vehicle to be driven by the drive power of the electric drive 3 when the internal combustion engine 5 is not in operation. The electric energy required to operate the electric drive 3 is supplied by the energy source 55. Operating states of the internal combustion engine 5 with low load, which would lead to poor efficiency of the internal combustion engine 5, can thus be avoided. A purely electric drive is particularly advantageous in urban traffic, where it is often only possible to drive with low load, since fuel can thus be saved and the emission of pollutants is reduced.

If the electric energy source 55 can no longer provide sufficient energy, i.e. if, for example, a specific voltage threshold value at which the electric drive 3 would no longer function is not reached, or of the driver requires greater torque, the internal combustion engine 5 is connected via the coupling 20.

If a situation occurs in which it is required to operate the internal combustion engine 5 in addition to the electric drive 3, the drive train and therefore the electric drive 3 and the (just started) internal combustion engine 5 are generally arranged at different speed levels. The internal combustion engine 5 may thus have a standard idling speed of approximately 700 to 1400 revolutions/minute, whilst the drive train and the electric drive have a speed of approximately 2000 to 5000 revolutions/minute. If the coupling 20 is closed in a situation of this type, the drive train will jerk, which is detrimental for driving comfort and may also be damaging for the components of the drive train.

SUMMARY

According to various embodiments, to avoid the drawbacks of the prior art and an improved method for operating a hybrid drive can be provided.

According to an embodiment, a method for operating a hybrid drive arrangement with an internal combustion engine having a drive shaft, the internal combustion engine comprising a throttle valve; an electric drive having a drive shaft; a coupling arranged between the internal combustion engine and the electric drive and controllable on demand in such a way that the drive shaft of the internal combustion engine and the drive shaft of the electric drive are coupled to one another in a torque-engaged manner; may comprise the following steps: detecting whether there is a requirement to interconnect the drive shaft of the internal combustion engine and the drive shaft of the electric drive; if there is a requirement: pilot-controlling the speed of the internal combustion engine to a target speed level in such a way that the drive shafts of the internal combustion engine and of the electric drive run at least approximately synchronously, the speed of the internal combustion engine being pilot-controlled by a default of a setpoint for an opening angle of the throttle valve; subsequent regulation of the speed of the internal combustion engine in such a way that the drive shafts of the internal combustion engine and of the electric drive run substantially synchronously; subsequent coupling of the drive shafts of the internal combustion engine and of the electric drive via the coupling.

According to a further embodiment, the opening angle of the throttle valve can be pilot-controlled for a predetermined time interval. According to a further embodiment, the setpoint for the opening angle can be lower than a maximum possible opening angle of the throttle valve. According to a further embodiment, the speed of the internal combustion engine can be operated with speed regulation, in particular idle speed regulation, before there is a requirement, there being a switch from speed regulation to pilot control when there is a requirement, speed regulation being switched back to following pilot control. According to a further embodiment, the time interval can be selected so as to be dependent on a speed differential between the current speed of the internal combustion engine and a target speed. According to a further embodiment, the time interval can be selected so as to be dependent on a work of friction of the internal combustion engine, which must be carried out until a target speed is reached. According to a further embodiment, the time interval can be substantially proportional to a sum of a kinetic energy to be expended by the internal combustion engine in order to reach the second speed level from a current first speed level, and an energy to be expended by the internal combustion engine in order to overcome an internal friction, values being recorded in each case for the kinetic energy and for the energy in a characteristic map. According to a further embodiment, there can be a requirement when a supply voltage for the electric drive falls below a threshold value. According to a further embodiment, the internal combustion engine can be controlled by an electric starting device if there is a corresponding requirement in the control unit. According to a further embodiment, the throttle valve can be opened and then closed again for the predetermined period of time for pilot control. According to a further embodiment, the period of time may be dependent on the speed of the second speed level. According to a further embodiment, the internal combustion engine can be switched from pilot control to speed regulation when an inlet pipe pressure falls below a threshold value. According to a further embodiment, there can be a switch from speed regulation of the internal combustion engine to torque regulation of the internal combustion engine following closure of the coupling.

According to another embodiment, a control unit may have an operating program for carrying out one of the methods as described above.

BRIEF DESCRIPTION OF THE DRAWINGS

The invention will be described in greater detail hereinafter with reference to the figures, in which.

DETAILED DESCRIPTION

Figure 1:
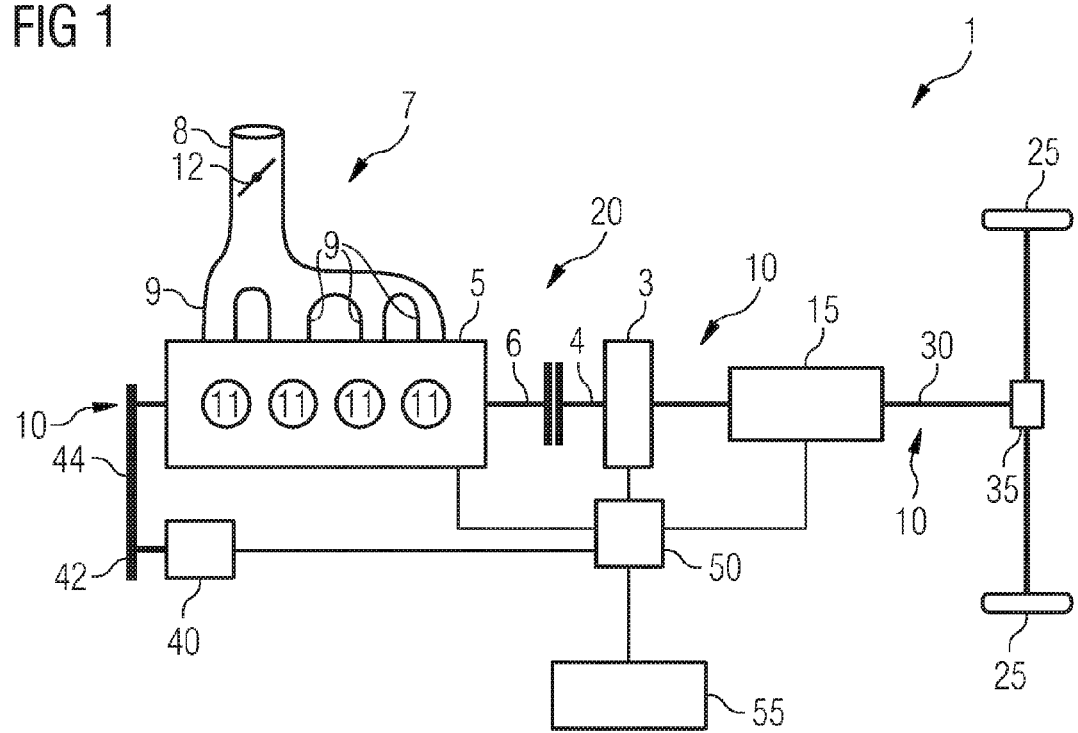
FIG. 1 is a schematic view of a hybrid drive arrangement, with reference to which the various embodiments will be described.

According to various embodiments, the following method for operating a hybrid drive arrangement can be provided, wherein the arrangement may comprise: an internal combustion engine having a drive shaft, the internal combustion engine comprising a throttle valve; an electric drive having a drive shaft; a gear unit coupled to the electric drive and having a gear output shaft; a coupling arranged between the internal combustion engine and the electric drive that is controllable on demand in such a way that the drive shaft of the internal combustion engine and the drive shaft of the electric drive are interconnected in a torque-engaged manner; and a control unit connected to the electric drive and to the internal combustion engine. The method may comprise the following steps: detecting whether there is a requirement to interconnect the drive shaft of the internal combustion engine and the drive shaft of the electric drive; if there is a requirement, increasing the speed of the internal combustion engine to a speed in such a way that the speed of the internal combustion engine and the speed of the electric drive are substantially synchronous; the speed of the internal combustion engine being pilot-controlled, the speed of the internal combustion engine being increased from a current first speed level N_1 to a second speed level N_2 corresponding to the current speed of the drive train and therefore of the electric drive, namely by default of a throttle valve setpoint TSP_SP of the throttle valve. The drive shafts of the internal combustion engine and of the electric engine are then coupled to one another via the coupling. The position of the throttle valve is adjusted by a position control. The pilot control may be carried out for a predetermined time interval Δt. The throttle valve setpoint TSP_SP may be lower than a maximum possible opening angle of the throttle valve.

In this instance it may be advantageous, by the temporal limiting to a time interval Δt of the pilot control of the throttle valve angle TSP_SP, which is lower than the maximum possible throttle valve angle, to only increase the speed of the internal combustion engine until the desired speed level N_2 has been substantially achieved. The speed of the internal combustion engine is thus matched precisely to the speed of the drive train by the speed regulator, in particular the idle speed regulator. Speed overshoots can therefore be largely avoided. The coupling between the internal combustion engine and the electric drive can thus be closed relatively quickly and in a jerk-free manner. This pilot control, i.e. the rapid increase in speed to a desired speed level by pilot control of a temporally limited throttle valve angle, makes it possible to quickly increase the speed of the internal combustion engine to the level of the drive train in spite of a high system idle time. The merely partial opening of the throttle valve is sufficient to achieve a high speed gradient of the internal combustion engine. However, the opening angle set is also a compromise in order to then close the throttle valve again quickly. Reference is therefore made to pilot control since the speed level is initially increased quickly and the speed of the internal combustion engine is adjusted, in a known manner, to a desired speed before the coupling is closed.

The time interval Δt is preferably substantially proportional to a sum of a kinetic energy $\Delta W_{kin}$ to be expended by the internal combustion engine in order to reach the second speed level N_2 from the current first speed level N_1, and of an energy $W_{Friction}$ to be expended by the internal combustion engine in order to overcome an internal friction, it being possible in each case to record values for the kinetic energy $\Delta W_{kin}$ and values for the energy $W_{Friction}$ in a characteristic map. In this case the throttle valve is only opened for the time interval Δt, the duration of which is dependent on the speed of the second speed level N_2, and is then closed again.

In this instance the advantage lies in that the time interval Δt, during which the throttle valve is opened far enough for the internal combustion engine to be increased from the first speed level N_1 to the second speed level N_2, can be deduced from the kinetic energy $\Delta W_{kin}$ to be expended by the internal combustion engine and from the frictional energy $W_{Friction}$ to be expended by the internal combustion engine. The internal combustion engine is thus largely prevented from achieving a speed that is too high for synchronization, i.e. the synchronous rotation of the drive shaft of the internal combustion engine with the drive shaft of the electric drive and the closure of the coupling, (known as an 'overshoot'). By avoiding an overshoot the internal combustion engine and the electric drive can be synchronized in a relatively short space of time and without any jerking.

There is thus a requirement for the drive shaft of the internal combustion engine and the drive shaft of the electric drive to be interconnected in a torque-engaged manner, for example if a supply voltage for the electric drive falls below a threshold value, or if a requirement of this type is predetermined by a user. It can therefore be ensured that the driving operation of the hybrid vehicle is not interrupted if, for example, the electric power supply for the electric drive is no longer sufficient.

Should the user require more power than can be supplied by the electric drive, then there is also a requirement of this type for the internal combustion engine to assist the electric drive.

It may also be advantageous for the internal combustion engine to be started by an electric starting device if there is a corresponding requirement in the control unit. In this case the starting device ensures that the internal combustion engine is brought to a desired speed relatively quickly so as to independently maintain the combustion process.

In a further embodiment a desired torque of the internal combustion engine is preferably reduced, in spurts, to a low value once a determined period of time ($\Delta t$) has elapsed, so as to prevent the speed from overshooting a target speed and in such a way that the internal combustion engine and the electric drive can be synchronized in a relatively short space of time.

If the speed of the internal combustion engine is in the range of the target speed, the throttle valve is quickly closed in such a way that the inlet pipe pressure in the inlet pipe also decreases. If the inlet pipe pressure falls below a threshold value, it is therefore preferably possible to switch from pilot control to regulation of the speed. In a further configuration it is then possible, i.e. following regulation to a target speed and following closure of the coupling, to end speed regulation of the internal combustion engine and to switch to torque regulation of the internal combustion engine.

FIG. 1 also shows an intake assembly 7 required for operation of the internal combustion engine 5, which intake assembly consists of an inlet pipe 8 and four air feed lines 9, the air sucked in through the inlet pipe 8 being fed though the air feed lines in each case to cylinders 11 of the internal combustion engine for the combustion process. A throttle valve 12 is arranged in the inlet pipe 8 and can be used to regulate the amount of air sucked in through the inlet pipe 8.

The method according to various embodiments that is carried out by the control unit 50 is described in greater detail with reference to FIGS. 2 and 3. A plurality of separate control units may also be arranged at the point of the single control unit 50 and these each control the starting device 40, the internal combustion engine 5, the electric drive 3 and the gear unit 15.

Figure 2:
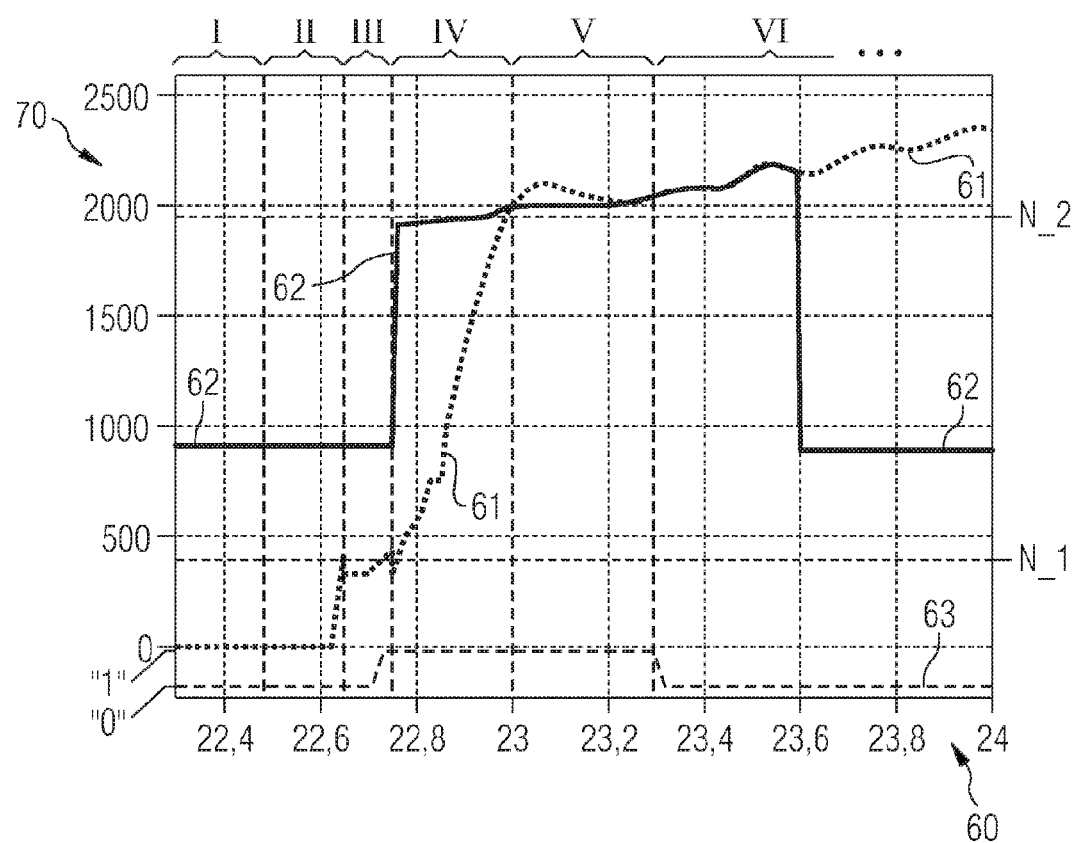
FIG. 2 is a diagram of the speed curve during the method according to various embodiments.

FIG. 2 shows a speed diagram, with reference to which the method according to various embodiments will now be described.

The diagram shown in FIG. 2 illustrates the temporal progression of a driving situation, which is divided into six successive time portions labeled with the Roman numerals I to VI.

Time values (in seconds) are plotted along the abscissa 60, speed values (in revolutions per minute) along the ordinate 70, and state values "0" and "1" for a curve 63. Three curves can also be seen that are denoted by reference numerals 61, 62 and 63 and have the following meanings:

61: speed of the internal combustion engine (dot-dash line);
62: desired value of a target speed to be achieved by the internal combustion engine (continuous line); and
63: state=1 if the speed regulator, in particular the idle speed regulator, is active or if the pilot control is activated (dashed line).

The current, first and second speed levels N_1, N_2 are also plotted (in each case at 300 and at 1900).

In time portion I the internal combustion engine 5 is initially turned off. The speed is zero. The motor vehicle is only moved by the electric drive 3.

At the beginning of time portion II (at 22.5 s) the control unit 50 decides that the electric drive 3 must be assisted by the internal combustion engine 5 since, for example, the supply voltage of the battery 55 has fallen below a threshold value or the driver requires greater torque (by pressing on an accelerator pedal).

The electric starting device 40 is activated (at 22.6 s) in order to start the internal combustion engine 5. The curve 61 (internal combustion engine speed) only increases at the beginning of time portion III by a delay in the torque output of the starting device, caused by the magnetic field forming in the electric starting device, and a delay in the speed detection of the internal combustion engine (the speed can only be detected when the crankshaft transmitter wheel has reached a specific position), the speed of the internal combustion engine 5 being increased to a value of approx. 300 revolutions/minute.

Torque is released from time portion IV by the working cycles of the internal combustion engine 5 and therefore the internal combustion engine speed is increased further. The starting device 40 is deactivated again from this moment. The internal combustion engine 5 is now idling, i.e. is at a first speed level N_1. The speed during idling may be between 700 and 900 r/min. When idling, the speed of the internal combustion engine is regulated by a speed regulator.

In order to now increase the speed of the internal combustion engine 5 as quickly as possible and preferably without any overshooting to a desired speed that has been increased in spurts (curve 62) and corresponds to the predicated second speed level N_2 with completed synchronization, the pilot control now starts and this supersedes the speed regulation of the internal combustion engine. The second speed level may lie in the range between 1900 and 5000 r/min. Test have shown that, owing to a high system idle time in the air path, the conflict of objectives between high synchronization speed and low speed overshoots cannot be overcome by a control loop.

During pilot control the throttle valve is preferably adjusted to an opening angle of approximately 40°. The fact that the throttle valve is adjusted to an opening angle of approximately 40° and is not opened approximately fully is caused by that fact that an opening of 40° is sufficient to supply enough air for the combustion process in order to achieve a sufficient speed gradient. In contrast to full opening of the throttle valve, less time is required for an opening of only 40° and for the subsequent closing, which has an advantageous effect on a short time period of the synchronization process.

The throttle valve is closed by a position control. The setpoint for the opening angle of the throttle valve can be seen in the diagram shown in FIG. 3 with reference to the curve 84 at the time value 22.7.

Before the mode of operation of the pilot control, in particular the determination of the time interval $\Delta t$ is described, the components of the diagram in FIG. 3 will first be explained.

Figure 3:
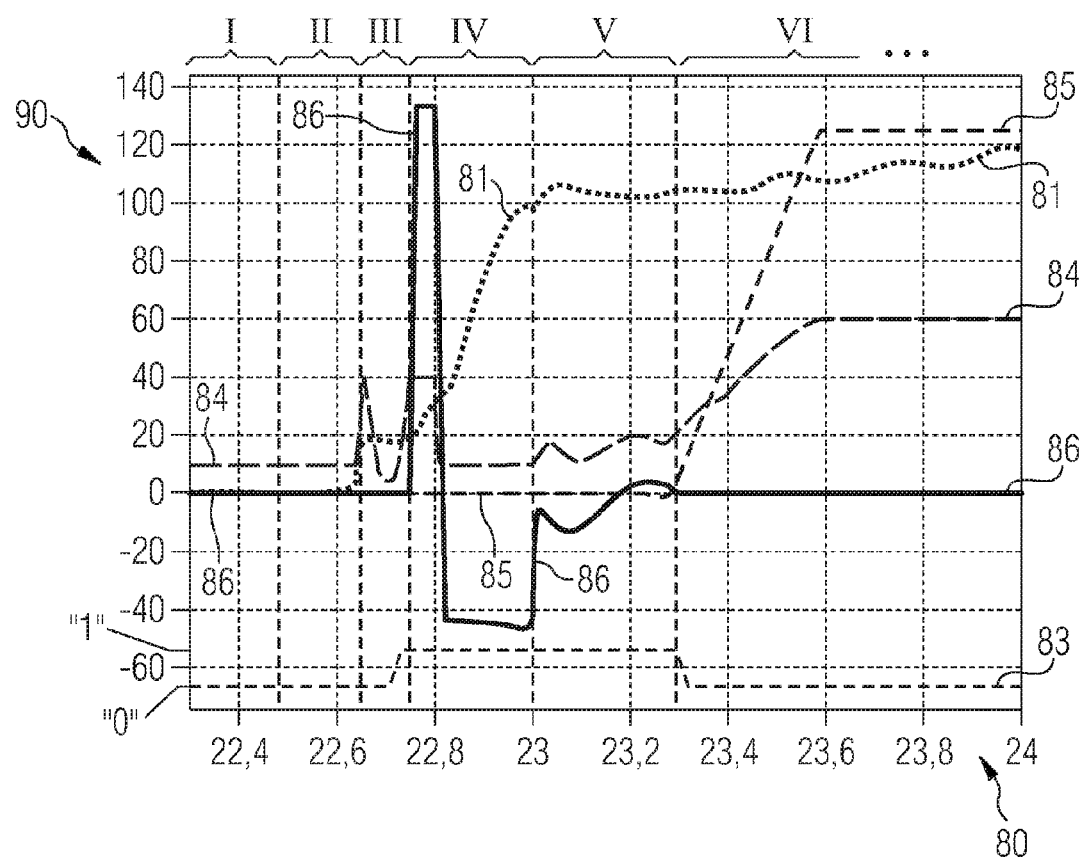
FIG. 3 is a diagram of the torque curve during the method according to various embodiments.

FIG. 3 basically shows a torque diagram of the same driving situation divided into time portions I to VI, in supplement to the speed diagram in FIG. 2.

Time values (in seconds) are in turn plotted along the abscissa 80, torque values (in Newton meters) along the ordinate 90 for curves 85 and 86, angular values (in °) for the setpoint of the throttle valve opening for a curve 84, speed values (in revolutions per minute) for a curve 81, and state values "0" and "1" for a curve 83. The curves have the following meanings:

81: speed of the internal combustion engine (dotted line);
83: state=1 if the speed regulator, in particular the idle speed regulator, is active or if the pilot control is active;

84: throttle valve setpoint (long dashes);
85: torque requirement of the internal combustion engine following closure of the coupling 20 and completed synchronization (short dashes); and
86: torque setpoints of the internal combustion engine during the synchronization process (dash-and-dot line).

As already described above for FIG. 2, since there is a corresponding requirement the pilot control starts at the beginning of time portion IV in FIG. 3, i.e. curve 83 increases to "1". The internal combustion engine is started with subsequent synchronization to the speed of the drive train, which is expressed by the jump of the idling speed setpoint from approx. 900 to 2000 rpm (FIG. 1). The torque requirement 85 is increased at the same time in such a manner that a throttle valve setpoint of approximately 40° (curve 84) is issued via the inlet pipe model as an input value for the throttle valve position control.

As can be seen with reference to curve 86, the torque setpoint of the internal combustion engine jumps, during the synchronization process, to a value of 130 Nm. A throttle valve setpoint is consequently established via the inlet pipe model and ensures that the throttle valve is opened.

The temporal limit Δt of the pilot control for the jump in the torque setpoint is established as follows from fundamental equations of the rotational movement of an internal combustion engine:

The work $W_{1\text{-}22\ 2}$ to be done by the internal combustion engine in order to reach the speed level N_2 from the speed level N_1 is given by the sum of the work of friction $W_{Friction}$ and the kinetic energy $\Delta W_{kin}$ to be expended, so:

$$W_{1\to 2} = W_{Friction} + \Delta W_{kin}.$$

With constant torque of friction, the following is given for work of friction based on the synchronization speed to be achieved:
$W_{Friction} = TQ_{Friction} = f(N\_2, \ldots)$ and φ, where φ is the angle of rotation of the internal combustion engine covered during the synchronization process
where in Friction (N_2)=f (N_2, TCO, TOIL, TQ_LOSS_AD) and φ is an angle of rotation.

In this instance:
TCO is the cooling water temperature of the internal combustion engine;
TOIL is the oil temperature of the internal combustion engine; and
TQ_LOSS_AD is the torque loss of the internal combustion engine owing to additional components, for example steering booster pump and air conditioning compressor.

For additional kinetic energy $\Delta W_{kin}$ the following is given with the moment of inertia J of the internal combustion engine:

$$\Delta W_{kin} = \frac{1}{2}J(N_2^2 - N_1^2).$$

With the assumption of a constant angular acceleration α during the synchronization process of the internal combustion engine, i.e. with an increase in the speed from the first to the second speed, the following is given:

$$\varphi = \frac{1}{2}(N_1 + N_2) * \Delta t$$

or $$\Delta W_{kin} = J(N_2 - N_1) * \varphi * \frac{1}{\Delta t}.$$

The following is given on application:

$$TQ * \varphi = TQ_{Friction} * \varphi + J(N_2 - N_1) * \varphi * \frac{1}{\Delta t},$$

from which it follows for the temporal limitation of the engagement of torque $$\Delta t = \frac{J(N_2 - N_1)}{TQ - TQ_{Friction}}.$$

In this case TQ is a function of the second speed N2, the predicated second speed level N2 with completed synchronization, and whereby TQ corresponds to the progression of the curve 86 in FIG. 3 during the temporal limitation Δt, i.e. reaches a short-term value of approx. 130 Nm.

The term $J(N_2-N_1)$ is recorded in a characteristic map of the control unit 50. The time over which torque engagement takes place in spurts, i.e. the throttle valve is opened in spurts, is therefore limited to Δt in such a way that there is practically no overshooting of the required speed of the internal combustion engine.

Once Δt has elapsed, the torque engagement is reduced again in spurts, as is shown by the progression of the curve 86 in FIG. 3 at t=22.9. The throttle valve is closed again in this way and the inlet pipe pressure is reduced by the internal combustion engine. The speed of the internal combustion engine is increased by the merely short-term opening and then closing of the throttle valve to a value that is close to the predicated second speed level N2.

At the beginning of the time portion V in FIG. 2 the speed is therefore already in the range of the setpoint. The speed of the internal combustion engine is finely tuned to the speed level of the curve 62 via the speed regulator (idle speed regulator) activated again at this moment.

A conventional speed regulator, for example an idle speed regulator, is therefore activated and ensures quick adjustment of the speed to the setpoint from time portion V. The speed regulator is preferably activated at the beginning of portion V when the inlet pipe pressure falls below a threshold value in such a way that the following must be satisfied for activation of the speed regulator:

MAP<C_THR_MAP_IS_JUMP_SLOW, where MAP is the inlet pipe pressure and C_THR_MAP_IS_JUMP_SLOW is an inlet pipe pressure threshold value.

At the beginning of time portion VI (see FIGS. 2 and 3), the internal combustion engine 5 has reached a speed that is synchronous with the speed of the electric drive 3, in such a way that the coupling 20 is closed with no noticeable change in the speed of the drive train, and operation of the internal combustion engine 5 is converted from speed-regulated to torque-regulated so as to assist acceleration of the vehicle. This is shown in FIG. 3 by the fall of the curve 86 (torque setpoint of the internal combustion engine during the synchronization process) to the value 0 and an increase in the torque requirement (curve 85) of the internal combustion engine following closure of the coupling 20 and completed synchronization. The increase in the torque requirement may be caused by an increased torque requirement on the part of the driver (desire to accelerate) or by the requirement to charge the vehicle battery because a low threshold value has not been reached.

What is claimed is:

1. A method for operating a hybrid drive arrangement with an internal combustion engine having a drive shaft, the internal combustion engine comprising a throttle valve; an electric drive having a drive shaft; a coupling arranged between the internal combustion engine and the electric drive and controllable on demand in such a way that the drive shaft of the internal combustion engine and the drive shaft of the electric drive are coupled to one another in a torque-engaged manner; the method comprising:
    detecting whether there is a requirement to interconnect the drive shaft of the internal combustion engine and the drive shaft of the electric drive;
    if there is a requirement to interconnect:
    pilot-controlling the speed of the internal combustion engine to a target speed level in such a way that the drive shafts of the internal combustion engine and of the electric drive run at least approximately synchronously, the speed of the internal combustion engine being pilot-controlled by a default of a setpoint for an opening angle of the throttle valve;
    subsequent regulation of the speed of the internal combustion engine in such a way that the drive shafts of the internal combustion engine and of the electric drive run substantially synchronously;
    subsequent coupling of the drive shafts of the internal combustion engine and of the electric drive via the coupling.

2. The method according to claim 1, wherein the opening angle of the throttle valve is pilot-controlled for a predetermined time interval.

3. The method according to claim 2, wherein the time interval is selected so as to be dependent on a speed differential between the current speed of the internal combustion engine and a target speed.

4. The method according to claim 2, wherein the time interval is selected so as to be dependent on a work of friction of the internal combustion engine, which must be carried out until a target speed is reached.

5. The method according to claim 4, wherein the time interval is substantially proportional to a sum of a kinetic energy to be expended by the internal combustion engine in order to reach the second speed level from a current first speed level, and an energy to be expended by the internal combustion engine in order to overcome an internal friction, values being recorded in each case for the kinetic energy and for the energy in a characteristic map.

6. The method according to claim 1, wherein the setpoint for the opening angle is lower than a maximum possible opening angle of the throttle valve.

7. The method according to claim 1, wherein the speed of the internal combustion engine is operated with speed regulation or idle speed regulation before there is a requirement, there being a switch from speed regulation to pilot control when there is a requirement, speed regulation being switched back to following pilot control.

8. The method according to claim 1, wherein there is a requirement when a supply voltage for the electric drive falls below a threshold value.

9. The method according to claim 1, wherein the internal combustion engine is controlled by an electric starting device if there is a corresponding requirement in the control unit.

10. The method according to claim 1, wherein the throttle valve is opened and then closed again for the predetermined period of time for pilot control.

11. The method according to claim 10, wherein the period of time is dependent on the speed of the second speed level.

12. The method according to claim 1, wherein the internal combustion engine is switched from pilot control to speed regulation when an inlet pipe pressure falls below a threshold value.

13. The method according to claim 1, wherein there is a switch from speed regulation of the internal combustion engine to torque regulation of the internal combustion engine following closure of the coupling.

14. A control unit having an operating programme for carrying out the method according to claim 1.

15. A system for operating a hybrid drive arrangement comprising:
    an internal combustion engine having a drive shaft, the internal combustion engine comprising a throttle valve;
    an electric drive having a drive shaft;
    a coupling arranged between the internal combustion engine and the electric drive and controllable on demand in such a way that the drive shaft of the internal combustion engine and the drive shaft of the electric drive are coupled to one another in a torque-engaged manner;
    a control unit operable to detect whether there is a requirement to interconnect the drive shaft of the internal combustion engine and the drive shaft of the electric drive, and if so, said control unit being further operable:
    to pilot-control the speed of the internal combustion engine to a target speed level in such a way that the drive shafts of the internal combustion engine and of the electric drive run at least approximately synchronously, the speed of the internal combustion engine being pilot-controlled by a default of a setpoint for an opening angle of the throttle valve;
    to subsequently regulate the speed of the internal combustion engine in such a way that the drive shafts of the internal combustion engine and of the electric drive run substantially synchronously; and
    to subsequently couple the drive shafts of the internal combustion engine and of the electric drive via the coupling.

16. The system according to claim 15, wherein the opening angle of the throttle valve is pilot-controlled for a predetermined time interval.

17. The system according to claim 16, wherein the time interval is selected so as to be dependent on a speed differential between the current speed of the internal combustion engine and a target speed.

18. The system according to claim 15, wherein the setpoint for the opening angle is lower than a maximum possible opening angle of the throttle valve.

19. The system according to claim 15, wherein the speed of the internal combustion engine is operated with speed regulation or idle speed regulation before there is a requirement, there being a switch from speed regulation to pilot control when there is a requirement, speed regulation being switched back to following pilot control.

* * * * *